US012598498B2

(12) United States Patent  
Du et al.

(10) Patent No.: US 12,598,498 B2  
(45) Date of Patent: Apr. 7, 2026

(54) MEASURING A REFERENCE SIGNAL WITH ASSOCIATED SYNCHRONIZATION SIGNAL

(71) Applicant: Nokia Technologies Oy, Espoo (FI)

(72) Inventors: Lei Du, Beijing (CN); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 321 days.

(21) Appl. No.: 18/272,392

(22) PCT Filed: Jan. 15, 2021

(86) PCT No.: PCT/CN2021/072263  
§ 371 (c)(1),  
(2) Date: Jul. 14, 2023

(87) PCT Pub. No.: WO2022/151393  
PCT Pub. Date: Jul. 21, 2022

(65) Prior Publication Data  
US 2024/0089774 A1     Mar. 14, 2024

(51) Int. Cl.  
*H04W 24/10* (2009.01)  
*H04W 56/00* (2009.01)  
(Continued)

(52) U.S. Cl.  
CPC ....... *H04W 24/10* (2013.01); *H04W 56/0015* (2013.01); *H04L 5/0048* (2013.01); *H04W 36/324* (2023.05)

(58) Field of Classification Search  
None  
See application file for complete search history.

(56) References Cited

U.S. PATENT DOCUMENTS

2018/0048445 A1   2/2018   Jung et al.  
2018/0368034 A1   12/2018   Lin et al.  
(Continued)

FOREIGN PATENT DOCUMENTS

CN       108353304 A     7/2018  
CN       110100492 A     8/2019  
CN       110475257 A     11/2019

OTHER PUBLICATIONS

Mediatek Inc., "On TRS/CSI-RS occasion(s) for idle/inactive mode UE power saving," 3GPP TSG RAN WG1 Meeting #103-e, R1-2008965, Oct. 26-Nov. 13, 2020.

*Primary Examiner* — Anh Vu H Ly  
(74) *Attorney, Agent, or Firm* — Carter, DeLuca & Farrell LLP

(57) ABSTRACT

Embodiments of the present disclosure relate to a method, device and computer readable storage medium of communication. The method implemented at a first device includes receiving, at a first device and from a second device, a measurement configuration to be performed by the first device, the measurement configuration including at least the following: first measurement occasions configured for the first device for receiving a reference signal, and information about a synchronization signal associated with the reference signal, the synchronization signal to be measured at second measurement occasions. The method also includes measuring the reference signal at one or more of the first measurement occasions. The method further includes skipping measuring the synchronization signal at one or more of the second measurement occasions.

8 Claims, 11 Drawing Sheets

800

810  
RECEIVE, FROM A SECOND DEVICE, A MEASUREMENT CONFIGURATION TO BE PERFORMED BY THE FIRST DEVICE

820  
MEASURE THE REFERENCE SIGNAL AT ONE OR MORE OF THE FIRST MEASUREMENT OCCASIONS

830  
SKIP MEASURING THE SYNCHRONIZATION SIGNAL AT ONE OR MORE OF THE SECOND MEASUREMENT OCCASIONS

(51) Int. Cl.
   *H04L 5/00*          (2006.01)
   *H04W 36/32*         (2009.01)

(56)                References Cited

U.S. PATENT DOCUMENTS

2019/0289552 A1*  9/2019  Jain ...................... H04B 7/0626
2020/0359247 A1*  11/2020  Yi ......................... H04W 80/02
2022/0124526 A1*  4/2022  Lee ................... H04W 36/0072
2023/0073100 A1*  3/2023  Maleki ............. H04W 52/0212

* cited by examiner

600

650

800

810

RECEIVE, FROM A SECOND DEVICE, A MEASUREMENT CONFIGURATION TO BE PERFORMED BY THE FIRST DEVICE

820

MEASURE THE REFERENCE SIGNAL AT ONE OR MORE OF THE FIRST MEASUREMENT OCCASIONS

830

SKIP MEASURING THE SYNCHRONIZATION SIGNAL AT ONE OR MORE OF THE SECOND MEASUREMENT OCCASIONS

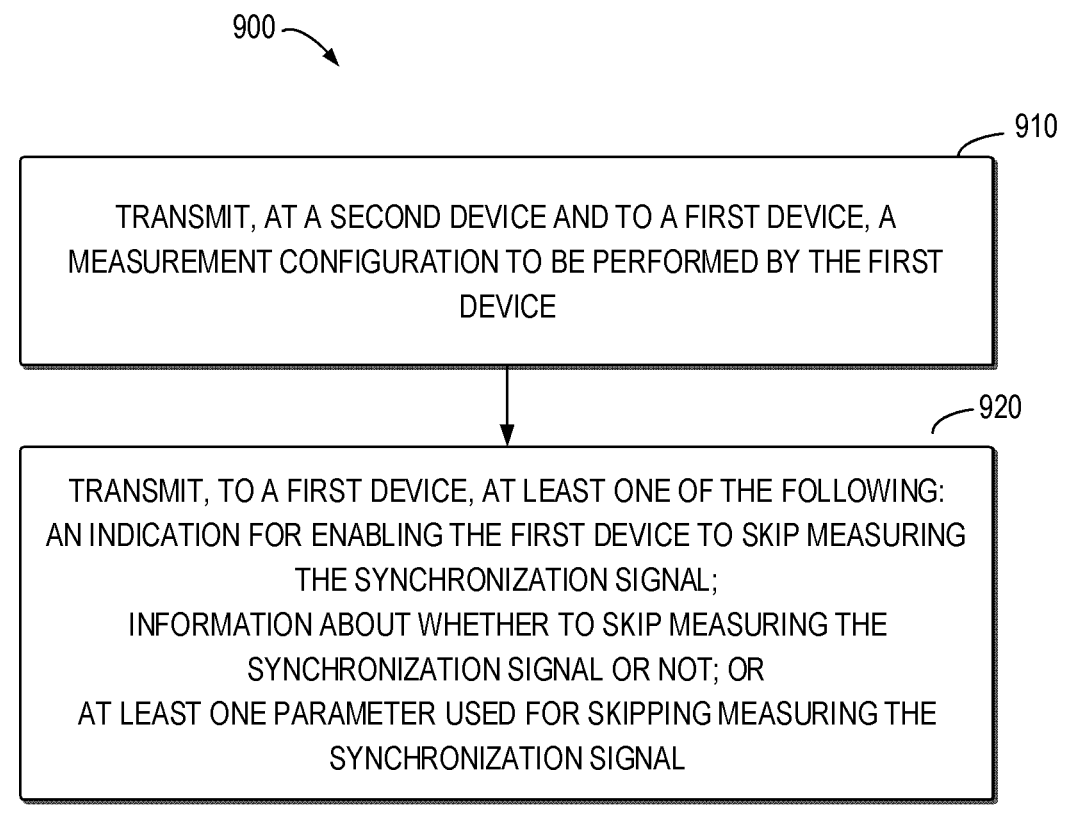

900

910

TRANSMIT, AT A SECOND DEVICE AND TO A FIRST DEVICE, A
MEASUREMENT CONFIGURATION TO BE PERFORMED BY THE FIRST
DEVICE

920

TRANSMIT, TO A FIRST DEVICE, AT LEAST ONE OF THE FOLLOWING:
AN INDICATION FOR ENABLING THE FIRST DEVICE TO SKIP MEASURING
THE SYNCHRONIZATION SIGNAL;
INFORMATION ABOUT WHETHER TO SKIP MEASURING THE
SYNCHRONIZATION SIGNAL OR NOT; OR
AT LEAST ONE PARAMETER USED FOR SKIPPING MEASURING THE
SYNCHRONIZATION SIGNAL

MEASURING A REFERENCE SIGNAL WITH ASSOCIATED SYNCHRONIZATION SIGNAL

CROSS REFERENCE TO RELATED APPLICATION

This patent application is a U.S. National Stage application of International Patent Application Number PCT/CN2021/072263 filed Jan. 15, 2021, which is hereby incorporated by reference in its entirety.

FIELD

Embodiments of the present disclosure generally relate to the field of telecommunication and in particular, to devices, methods and computer readable storage media for measuring reference signal (RS) with associated synchronization signal (SS).

BACKGROUND

Recently, channel state information-reference signal (CSI-RS) has been designed for tracking and beam management as well as for Layer 3 (L3) mobility management. In case that a CSI-RS based beam management is applied, compared to Synchronization Signal Block (SSB) based measurement, finer beam information be can provided the by CSI-RS based L3 measurement. Therefore, CSI-RS based L3 measurement enables a network device to handover user equipment (UE) directly to the more refined beam in a target cell during the handover procedure.

In some scenarios, the device (such as, a terminal device) is configured to measure the CRS-RS and the SSB simultaneously. However, some terminal devices do not support receiving the CRS-RS and the SSB simultaneously. Therefore, the terminal device has to measure the CRS-RS and the SSB alternatively, which brings an undesirable delay.

SUMMARY

In general, example embodiments of the present disclosure provide a solution for measuring RS with an associated SS.

In a first aspect, there is provided a first device. The first device comprises at least one processor; and at least one memory including computer program code; where the at least one memory and the computer program code are configured to, with the at least one processor, cause the first device to receive, from a second device, a measurement configuration to be performed by the first device, the measurement configuration comprising at least the following: first measurement occasions configured for the first device for receiving a reference signal, and information about a synchronization signal associated with the reference signal, the synchronization signal to be measured at second measurement occasions; measure the reference signal at one or more of the first measurement occasions; and skip measuring the synchronization signal at one or more of the second measurement occasions.

In a second aspect, there is provided a second device. The second device comprises at least one processor; and at least one memory including computer program code; where the at least one memory and the computer program code are configured to, with the at least one processor, cause the second device to transmit, to a first device, a measurement configuration to be performed by the first device, the measurement configuration comprising at least the following:

first measurement occasions configured for the first device for receiving a reference signal, and information about a synchronization signal associated with the reference signal, the synchronization signal to be measured at second measurement occasions; and transmit, to a first device, at least one of the following: an indication for enabling the first device to skip measuring the synchronization signal; information about whether to skip measuring the synchronization signal or not; or at least one parameter used for skipping measuring the synchronization signal.

In a third aspect, there is provided a method. The method comprises receiving, at a first device and from a second device, a measurement configuration to be performed by the first device, the measurement configuration comprising at least the following: first measurement occasions configured for the first device for receiving a reference signal, and information about a synchronization signal associated with the reference signal, the synchronization signal to be measured at second measurement occasions. The method further comprises measuring the reference signal at one or more of the first measurement occasions. The method also comprises skipping measuring the synchronization signal at one or more of the second measurement occasions.

In a fourth aspect, there is provided a method. The method comprises transmitting, at a second device and to a first device, a measurement configuration to be performed by the first device, the measurement configuration comprising at least the following: first measurement occasions configured for the first device for receiving a reference signal, and information about a synchronization signal associated with the reference signal, the synchronization signal to be measured at second measurement occasions. The method further comprises transmitting, to a first device, at least one of the following: an indication for enabling the first device to skip measuring the synchronization signal; information about whether to skip measuring the synchronization signal or not; or at least one parameter used for skipping measuring the synchronization signal.

In a fifth aspect, there is provided a first apparatus. The first apparatus comprises means for receiving, at a first apparatus and from a second apparatus, a measurement configuration to be performed by the first apparatus, the measurement configuration comprising at least the following: first measurement occasions configured for the first apparatus for receiving a reference signal, and information about a synchronization signal associated with the reference signal, the synchronization signal to be measured at second measurement occasions. The first apparatus further comprises means for measuring the reference signal at one or more of the first measurement occasions; The first apparatus also comprises means for skipping measuring the synchronization signal at one or more of the second measurement occasions In a sixth aspect, there is provided a second apparatus. The second apparatus comprises means for transmitting, at a second apparatus and to a first apparatus, a measurement configuration to be performed by the first apparatus, the measurement configuration comprising at least the following: first measurement occasions configured for the first apparatus for receiving a reference signal, and information about a synchronization signal associated with the reference signal, the synchronization signal to be measured at second measurement occasions. The second apparatus further comprises means for transmitting, to a first apparatus, at least one of the following: an indication for enabling the first apparatus to skip measuring the synchronization signal; at least one parameter used for skipping measuring the synchronization signal In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 9 illustrates a flowchart of an example method according to some embodiments of the present disclosure;

Throughout the drawings, the same or similar reference numerals represent the same or similar element.

DETAILED DESCRIPTION

Figure 1:
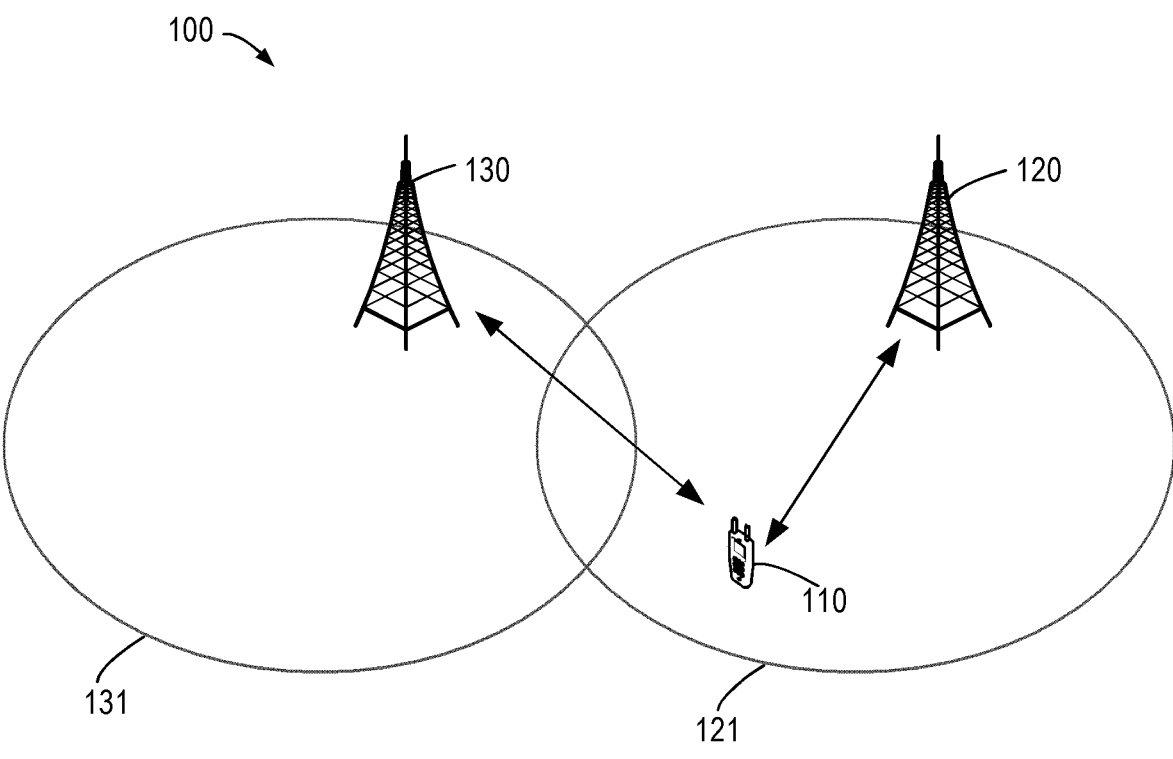
FIG. 1 illustrates an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

As used herein, the term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "RS" refers to any signal with a pre-defined value and to be measured by a device in the wireless communication network. The RS may include, but not limited to, CSI-RS, Demodulation Reference Signal (DRMS), cell-specific reference signals (CRS), positioning reference signal (PRS), and the like. In the following, a CSI-RS will be used as an example of the RS for describing some example embodiments of the present disclosure. It is noted that example embodiments of the present disclosure are equally applicable to other RS(s).

As used herein, the terms "SS" and "SSB" refers to any signal that is capable of providing synchronization/timing information. The "SS" and "SSB may include, but not limited to, primary synchronization signal (PSS), secondary synchronization signal (SSS), physical broadcast channel (PBCH) signal, and the like. In the present disclosure, the terms "SS" and "SSB" are equivalent with each other.

As used herein, the term "resource" may refer to any resource for performing a communication, for example, a communication between two devices in a communication network, such as a resource in time domain, a resource in frequency domain, a resource in space domain, a resource in code domain, a resource in a combination of more than one domain or any other resource enabling a communication, and the like. In the following, the example embodiments are described with respect to time domain. It is noted that example embodiments of the present disclosure are equally applicable to other resources in other domains.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discussed, the CSI-RS based L3 measurement has been discussed by a work item of the third Generation Partnership Project (3GPP). In addition to defining functionality of CSI-RS based L3 measurement, 3GPP also defines some measurement requirements for the CSI-RS based L3 measurement. The measurement requirements for CSI-RS based L3 measurement include, for example, the aspects of CSI-RS measurement bandwidth for minimum requirements, CSI-RS based intra-frequency and inter-frequency definitions, intra-frequency and inter-frequency measurement requirements, accuracy evaluation and specification, additional UE measurement capability, including the number of frequency layers and the number of cells, and the performance requirements. Moreover, in the aspect of assumptions on synchronization, single Fast Fourier Transform (FFT) may be assumed for multiple cell measurements per frequency layer for both intra-frequency and inter-frequency measurements in some scenarios.

Further, as discussed above, in some scenarios, the device (such as, a terminal device) is configured to measure the CRS-RS and the SSB simultaneously. Regarding this specific scenario, some agreements are reached as following:

No additional component (also referred to as "searcher" sometime) is proposed to be designed for CSI-RS based L3 measurement (such as, PSS/SSS detection);

Synchronization and measurement for CSI-RS based measurement can be performed by using the same components for SSB based measurement; and Do not introduce new UE capability on the simultaneous reception of CSI-RS and SSB.

Following to the above agreements, if a terminal device is configured to measure the CRS-RS and the SSB simultaneously, the terminal device has to measure the CSI-RS and SSB alternatively. Therefore, 3GPP standard define the core/performance requirements for CSI-RS based L3 measurement based on an assumption that the terminal device does not support simultaneous reception or measurements of CSI-RS and SSB. As one example, below Table 1 stipulated in 3GPP standards defines measurement period for intrafrequency CSI-RS based measurements without gaps for frequency of frequency range 1 (FR1)

TABLE 1

| measurement period for intrafrequency CSI-RS based measurements | |
| --- | --- |
| discontinuous reception (DRX) cycle | $T_{CSI\text{-}RS\_measurement\_period\_intra}$ |
| No DRX | $\max(200 \text{ ms}, \mathrm{ceil}([5] \times K_p) \times \text{CSI-RS period}) \times \mathrm{CSSF}_{intra}$ where $K_p$ is a frequency overlap factor |
| DRX cycle ≤ 320 ms | $\max(200 \text{ ms}, \mathrm{ceil}(1.5 \times [5] \times K_p) \times \max(\text{CSI-RS period}, \text{DRX cycle})) \times \mathrm{CSSF}_{intra}$ where $\mathrm{CSSF}_{intra}$ is carrier specific scaling factor |
| DRX cycle > 320 ms | $\mathrm{ceil}([5] \times K_p) \times \text{DRX cycle} \times \mathrm{CSSF}_{intra}$ |

The requirements apply assuming CSI-RS configuration with {D = 3 with PRBs ≥ 48}. D is frequency domain density for the 1-port CSI-RS for L3 mobility.

Therefore, according to the conventional solutions, if the terminal device is configured to measure the CRS-RS and the SSB simultaneously, a periodicity for measuring the CRS-RS has been increased due to the interruption of SSB based measurement, which brings an undesirable delay especially when the measurements results are used for functions such as, mobility managements, tracking and beam management.

According to some example embodiments of the present disclosure, there is proposed a solution for measuring a RS with associated SS. It is to be understood that the solution of the present disclosure can be applied to measuring a RS of any suitable type, and the SS configured to be associated with the RS can be a SS of any suitable type.

In this solution, a first device (such as, a terminal device) receives a measurement configuration to be performed by the first device from a second device (such as, a network device). The measurement configuration indicates first measurement occasions configured for the first device for receiving a RS. Further, the measurement configuration indicates information about a SS associated with the RS. Then, the first device measures RS at one or more of the first measurement occasions after the first device has acquired the synchronization timing of the cell based on the measurement of a SS associated with the RS. In particular, the first device skips measuring SS at one or more second measurement occasions configured for the first device for receiving SS. In this way, the first device is configured with an associated SS, such that synchronization timing for the RS may be determined. Further, by skipping measuring the SS at one or more of the second measurement occasions, the measurement delay due to the interruption of SS measurement is reduced.

FIG. 1 illustrates an example communication environment 100 in which embodiments of the present disclosure can be implemented. As shown in FIG. 1, the environment 100 includes a first device 110, a second device 120 and a third device 130. In some example embodiments, the first device 110 may be a terminal device, the second device 120 may be a network device serving the first device 110, and the third device 130 may be a network device neighboring the second device 120. The second device 120 provides a cell 121 for the first device 110, which may be referred to as a serving cell 121. The third device 130 provides a cell 131 for the first device 110, which may be also referred to as a neighbor cell 131.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the numbers, connection relationships and types of first, second and third devices as shown in FIG. 1 are only for the purpose of illustration without suggesting any limitations. The environment 100 may include any suitable number and type of first, second and third devices adapted for implementing embodiments of the present disclosure.

Although not shown, it is to be understood that one or more additional first devices, second devices and third devices may be located in the respective cells. It would also be appreciated that in some examples, only the homogeneous network deployment or only the heterogeneous network deployment may be included in the environment 100.

In the specific example of FIG. 1, the first device 110 is served by the second device 120, which means that the first device 110 may receive messages or signaling from the second device 120. For example, the first device 110 may receive a message comprising a measurement configuration from the second device 120. Further, the first device 110 can communicate with both the second device 120 and the third device 130. For example, the second device 120 and the third device 130 may transmit respective SSs (for example, SSB) and/or RSs (for example, CSI-RS, and the first device 110 may receive and measure the respective SSs and/or RSs) on pre-configured resources (for example, measurement occasions) based on configuration information about the respective RSs. Further, the first device 110 may measure the RSs and transmit the measurement results to the second device 120.

Example embodiments of the present disclosure will be described in detail below with reference to the accompanying drawings.

Figure 2:
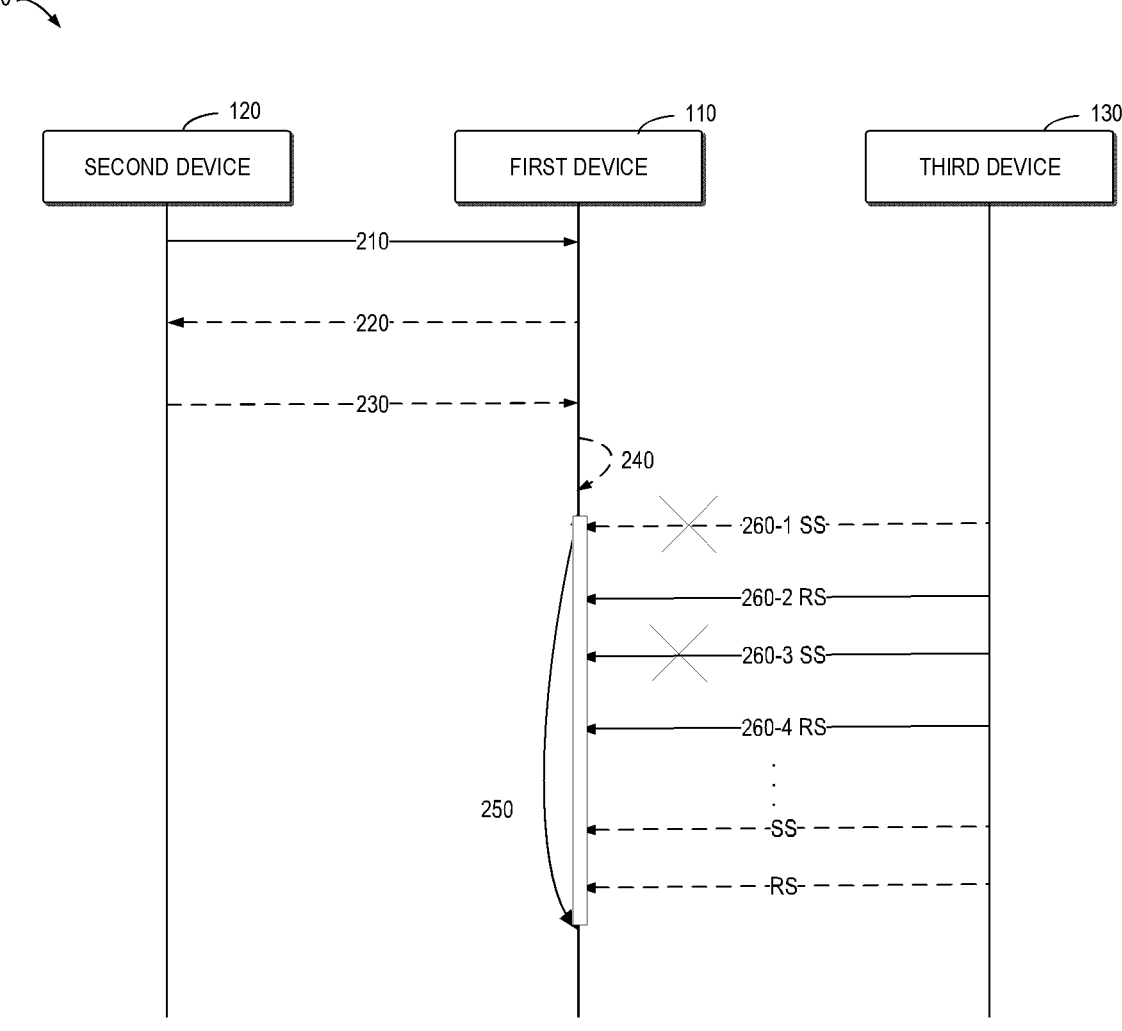
FIG. 2 illustrates a flowchart illustrating an example process for measuring RS with associated SS according to some embodiments of the present disclosure.

Reference is now made to FIG. 2, which shows a signaling flow 200 for measuring RS with associated SS according to some example embodiments of the present disclosure. For the purpose of discussion, the signaling flow 200 will be described with reference to FIG. 1. The signaling flow 200 may involve a first device 110, a second device 120 and a third device 130.

In the specific example of FIG. 2, the first device 110 is configured to measure a RS with associated SS. Further, the first device 110 is served by the second device 120 and locates in the cell 121.

In operation, the first device 110 receives 210 a measurement configuration to be performed by the first device 110. In particular, the measurement configuration indicates first measurement occasions configured for the first device 110 for receiving and measuring a RS (such as, a RS from a neighbor cell 131).

In some of the example embodiments, the first device 110 is configured to measure RS only if a SS associated with the RS is configured and detected. For purpose of discussion, the SS associated with the RS is referred to as the associated SS. The associated SS indicates the timing of the RS resources (i.e., the first measurement occasions) to be measured. In other words, the first device 110 may measure synchronization timing of the cell by measuring the associated SS, and the measured synchronization timing may be used for measuring the RS.

Therefore, in some of the example embodiments, the measurement configuration further indicates information about the associated SS.

The following is an example for measurement configuration in case that the RS is a CSI-RS and the associated SS is an associated SSB. For this specific scenario, the IE CSI-RS-ResourceConfigMobility may be used as the measurement configuration to configure CSI-RS measurements. The IE CSI-RS-ResourceConfigMobility indicates the CSI-RS resources (such as, first measurement occasions) to be measured in respective cell(s) (such as, neighbor cell 131), and each CSI-RS resource is identified by an index. Further, in this IE, associated SSB may be configured to indicate the timing of the CSI-RS resource to be measured.

It is to be understood that the above measurement configuration may be represented as any existing or newly-defined information element (IE), configuration, field, and parameter, and transmitted via any existing or newly-defined signaling or messages.

In some of the example embodiments, the first device 110 is configured to measure RS only if the associated SS is configured and the first device 110 detects the associated SS according to the measurement configuration. Still taking the above IE CSI-RS-ResourceConfigMobility as one example, in this specific example, if the associated SS is configured, the first device 110 is required to measure RS only if the associated SS is detected. In other word, the first device 110 needs to detect the associated SS (such as, a SSB) before the first device 110 can measure the RS. For example, if associated SSB is configured, the first device 110 shall base the timing of the CSI-RS resource indicated in CSI-RS-Resource-Mobility on the timing of the cell indicated by the cellId in the CSI-RS-CellMobility. And the timing of the cell is acquired by detecting the associated SSB. Further, if associated SSB is not configured, the first device 110 may use the timing of serving cell for the CSI-RS based measurement. More specifically, the first device 110 may base the timing of the CSI-RS resource indicated in CSI-RS-Resource-Mobility on the timing of the serving cell (such as, serving cell 121) indicated by refServCellIndex.

Therefore, a measurement procedure of RS with an associated SS may be divided in two phases:

First phase: SS-based cell identification and Index detection based on associated SS; and Second phase: RS based measurement.

Figure 3:
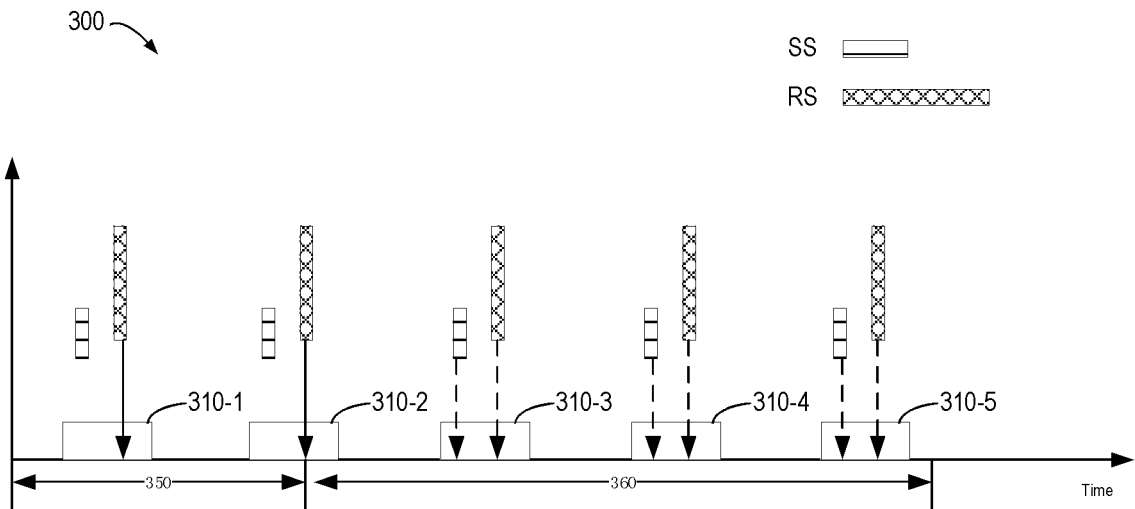
FIG. 3 illustrates a block diagram of example measurement procedure according to some example embodiments of the present disclosure.

Reference is now made to FIG. 3, which illustrates a block diagram of example measurement procedure 300 according to some example embodiments of the present disclosure.

In the specific example of FIG. 300, five second measurement occasions 310-1 to 310-5 are illustrated. The first measurement occasions are captured in the five second measurement occasions. The first device 110 is configured to measure or detect the SS at the second measurement occasions and measure the RS at the pre-configured RS resources. One example of the second measurement occasion is SS/PBCH block measurement timing configuration (SMTC) duration. It is to be understood that the numbers of second measurement occasions shown FIG. 3 is only for the purpose of illustration without suggesting any limitations.

As illustrated in FIG. 3, the measurement procedure 300 is divided into two phases, i.e., first phase 350 and second phase 360. The first phase 350 includes the time period used for SS detection and the time period to acquire the index of associated SS, and the second phase 360 is used for measurement of the RS over the pre-configured RS resources.

As discussed above, the first device 110 shall only start measuring the RS over the pre-configured RS resources after detection of associated SSB. Therefore, the first device 110 can measure RS merely in the second phrase 360. Further, when measuring the RS, the first device needs to keep obtaining synchronization timing. In the specific example of FIG. 3, as an associated SS is configured, therefore, the first device 110 is configured to determine the synchronization timing from the configured associated SS.

According to the above descriptions, it is noted that the measurement performed during the second phrase 360 seems to be complicated and desirable to be further discussed.

It is further noted that it is preferable that the first device 110 monitors both RS resource and its associated SSB in the second phrase 360, such that the first device 110 can keep obtaining the valid synchronization timing of the neighbor cell 131 to be measured. However, according to current agreements, the measurement of RS shares the same components (i.e., the same searcher) with the measurement of SS, which causes that the terminal device 110 are not able to measure both CSI-RS and SSB in parallel in the second phrase 360. Therefore, the terminal device 110 seems to have to measure the RS and the SS alternatively, which brings undesirable delay for the measurement of RS. In summary, the requirements for obtaining valid synchronization timing and reducing delay of RS measurement seem to be conflict with each other.

According to some embodiments of the present disclosure, the above confliction in the second phrase 2 may be alleviated. The detailed procedure for the second phrase 360 will be further discussed by referring back to FIG. 2.

The first device 110 performs 250 the measurement of RS according to the measurement configuration. In some example embodiments, the first device 110 measures the RS at one or more of the first measurement occasions, and skips measuring the SS at one or more of the second measurement occasions.

In the specific example of FIG. 2, the first device 110 is configured to measure the RS from the neighbor cell 131, and the third device 130 is the network device of the neighbor cell 131. As illustrated in FIG. 2, the third device 130 transmits 260-1, 260-3 SS at the second measurement occasions, while these second measurement occasions are skipped by the first device 110. Further, the third device 130 transmits 260-2, 260-4 RS at the first measurement occasions, while RSs transmitted at these first measurement occasions are measured by the first device 110.

It is to be understood that the numbers of the SS and RS as shown in FIG. 2 are only for the purpose of illustration without suggesting any limitations. In other example embodiments, more or less SS and RS may be transmitted or measured. Further, the SS being skipped and the RS being measured as shown in FIG. 2 are only for the purpose of illustration without suggesting any limitations. In other example embodiments, other SS(s) may be skipped and other RS(s) may be measured.

In this way, as the number of the measurements of the SS is reduced, the measurement occasions can be used for the measurement of RS and the delay of the measurement of RS in reduced accordingly. Meanwhile, a reduced power computation of the first device 110 is achieved.

In some example embodiments, the first device 110 may skip measuring the SS according to some certain criterion or condition, which will be discussed as below.

In some example embodiments, the first device 110 skips measuring the SS at one or more of the second measurement occasions if synchronization timing determined from the SS being valid for measuring the RS. As discussed above, measuring the SS is used for determining synchronization timing for the RS resource, such that the measurement of RS may be performed. Further, it is assumed that the measured synchronization timing may be valid within a period. As a result, if the synchronization timing has just been measured not long (for example, within a period), measuring the SS does not seem to be a necessary operation, and may be skipped thereby. In this way, an unnecessary measurements of SS is skipped, the delay of the measurements of RS is reduced.

The second measurement occasions are configured for the first device 110 for receiving the SS from the neighbor cell(s) (such as, neighbor cell 131). The first measurement occasions indicated by the measurement configuration can be configured by the second device 120 dynamically and flexibly. Therefore, in some cases, the first measurement occasions may be configured to at least partly overlap the second measurement occasions.

In order to ensure a minimized delay of the measurement of RS, in some example embodiments, the first device 110 skips measuring the SS at one or more of the second measurement occasions where the second measurement occasions being overlapped with the first measurement occasions. In this way, the delay of the measurement of RS in minimized, and a better performance of mobility management may be achieved.

Additionally, in addition to comprising the period for receiving or detecting the signal at respective transmission, the period for measuring a signal may also comprises a period for processing the signal. In some cases, processing the signals at the first device 110 also affects receiving further signals. As a result, even the second measurement occasions are not overlapped with the first measurement occasions, the first device 110 still cannot able to receive the RS and SS in parallel. Therefore, the period for processing the signal may also be considered when determining whether to skip measuring SS or not. Alternatively, or in addition, in some example embodiments, the first device 110 skips measuring the SS at one or more of the second measurement occasions if measuring or processing the RS conflicts with measuring the SS. In this way, the measurement of RS may be better guaranteed.

In case that the neighbor cell 131 to be measured is synchronous with the serving cell 121, the synchronization timing of the serving cell 121 can be equivalent to the synchronization timing of the neighbor cell 131. Further, the first device 100 is usually better synchronized with the serving cell 121. Therefore, in some example embodiments, the first device 110 skips measuring the SS at one or more of the second measurement occasions if the neighbor cell 131 is synchronous with the serving cell 121. In this way, an unnecessary measurements of SS is skipped, the delay of the measurements of RS is reduced.

Alternatively, or in addition, in some example embodiments, if the first device 110 receives an indication that indicates the neighbor cell is synchronous with the serving cell 121 from the second device 120, the first device 110 determines the neighbor cell 131 being synchronous with the serving cell 121.

In one example, IE deriveSSB-IndexFromCell is used as one specific example of the indication that indicates the neighbor cell is synchronous with the serving cell 121. More specifically, IE deriveSSB-IndexFromCell indicates that the SFN and frame boundary alignment across cells on the same frequency carrier. When IE deriveSSB-IndexFromCell is configured in the measurement object or system information (SI), the first device 110 may determine that the synchronization timing of RS resources may be determined from the synchronization timing of the serving cell 121. Therefore, the first device 110 does not need to monitor SS in neighbor cell 131 additionally.

It is to be understood that the first device 110 may determine whether the neighbor cell is synchronous with the serving cell 121 with any suitable manner.

Alternatively, or in addition, in some example embodiments, the first device 110 skips measuring the SS at one or more of the second measurement occasions if the RS is also configured as a tracking RS. Alternatively, or in addition, in some example embodiments, the first device 110 skips measuring the SS at one or more of the second measurement occasions if a period between a current time point and a pervious time point of a last measurement of the synchronization signal is shorter than a pre-configured period. The pre-configured period may be determined or configured by the first device 110 itself, or be configured by the second device 120.

If the first device 110 moves slowly, the possibility of mobility managements (such as, handover) will be relative lower, compared with a scenario that the first device 110 moves fast. Alternatively, or in addition, in some example embodiments, the first device 110 skips measuring the SS at one or more of the second measurement occasions if a moving velocity of the first device 110 is below a velocity threshold. The moving velocity can be estimated based on the number of handover within a certain time period e.g. if the number of handovers is smaller than a velocity threshold, the first device 110 is considered moving slowly and the first device 110 can skip measuring the SS at one or more of the second measurement occasions. The velocity threshold may be determined or configured by the first device 110 itself, or be configured by the second device 120.

In some example embodiments, the first device 110 skips measuring the SS at one or more of the second measurement occasions if signal strength of the RS is above a strength threshold. More specifically, if the first device 110 determines that the signal strength of the RS is above a strength threshold, the first device 110 may determine the synchronization timing for the RS is still valid. As a result, measuring SS seems to be not necessary.

In addition to skipping measuring the SS according to some certain criterion or condition as discussed above, the first device 110 also may skip measuring the SS at one or more of the second measurement occasions in any suitable manner, which will be discussed as below.

In some example embodiments, the first device 110 skips measuring the SS at one or more of the second measurement occasions by disabling measuring the SS at the second measurement occasions.

Figure 4:
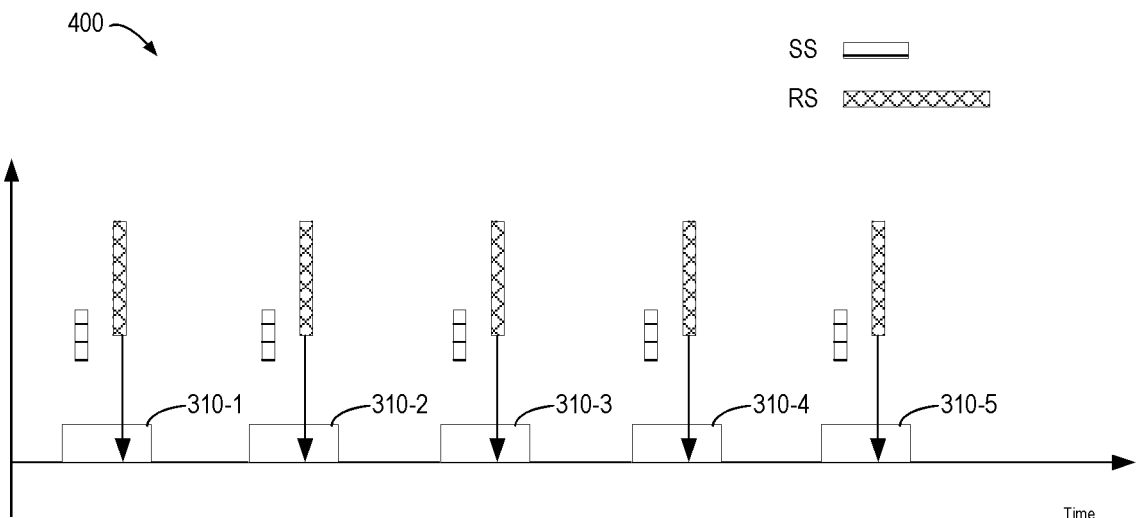
FIG. 4 illustrates a block diagram of example measurement procedure according to some example embodiments of the present disclosure.

Reference is now made to FIG. 4, which illustrates a block diagram of example measurement procedure 400 according to some example embodiments of the present disclosure. For the sake of brevity, the same elements in FIG. 4 and FIG. 3 are labelled with same reference number and the descriptions of the same elements are omitted below.

As illustrated in FIG. 4, the first device 110 disables measuring the SS. Therefore, the measurement of RS will not be interrupted and the delay of the measurement of RS is minimized thereby.

Additionally, in some example embodiments, the first device 110 may determine whether to disable measuring the SS or not according to some criterion or condition. For example, if the first device 110 determines that the measurement of SS is an unnecessary procedure, the first device 110 may disable measuring the SS.

In some example embodiments, the first device 110 disables measuring the SS at the second measurement occasions if the first device 110 determines that the neighbor cell 131 is synchronous with the serving cell 121.

Alternatively, or in addition, in some example embodiments, the first device 110 disables measuring the SS at the second measurement occasions if the first device 110 determines that the RS is configured as a tracking RS.

It is to be understood that the above examples of criterion or condition are only for the purpose of illustration without suggesting any limitations. In some other example, the first device 110 may determine whether to disable measuring the SS according to any suitable criterion or condition.

Alternatively, or in addition, in some example embodiments, the first device 110 skips measuring the SS by suspending measuring the SS at one or more of the second measurement occasions. More specifically, merely suspended part of the second measurement occasions are skipped rather than disable measuring the SS.

Figure 5A:
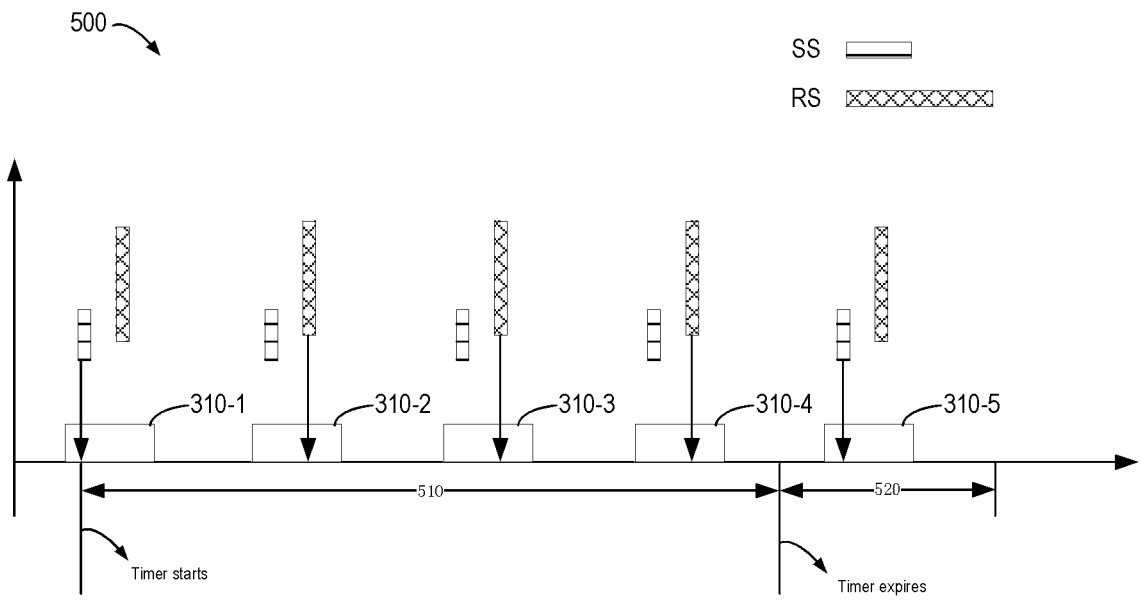
FIGS. 5A and 5B illustrate block diagrams of example measurement procedure according to some example embodiments of the present disclosure, respectively.

In some example embodiments, the first device 110 starts a validity timer and suspends measuring the SS at one or more of the second measurement occasions if the validity timer is not timeout. Reference is now made to FIG. 5A, which illustrates a block diagram of example measurement procedure 500 according to some example embodiments of the present disclosure. For the sake of brevity, the same elements in FIG. 5A and FIG. 3 are labelled with same reference number and the descriptions of the same elements are omitted below.

As illustrated in FIG. 5A, the second measurement occasions are overlapped with the first measurement occasions, which means that within each of the second measurement occasions 310-1 to 310-5, only one signal can be measured.

In the specific example of FIG. 5A, the first device 110 starts a validity timer first, and then during the period 510, the first device 110 suspends measuring the SS and merely measures RS. As there is no interruption from measuring the SS, all the measurement occasions can be used for measuring RS. Therefore, the delay of the measurement of RS is reduced and a faster RS measurement can be achieved.

Further, if the validity timer expires, the first device 110 resumes to measure the SS. As illustrated in FIG. 5A, during the period 520, the first device 110 resumes measuring the SS. Further, during the period 520, as the RS resources to be measured overlapped with the SS resources to be measured, the first device 110 may apply a scheduling restriction on both SS and RS resources to be measured. Further, the first device 110 may be configured to prioritize detection of SS at the second measurement occasion(s).

Figure 5B:
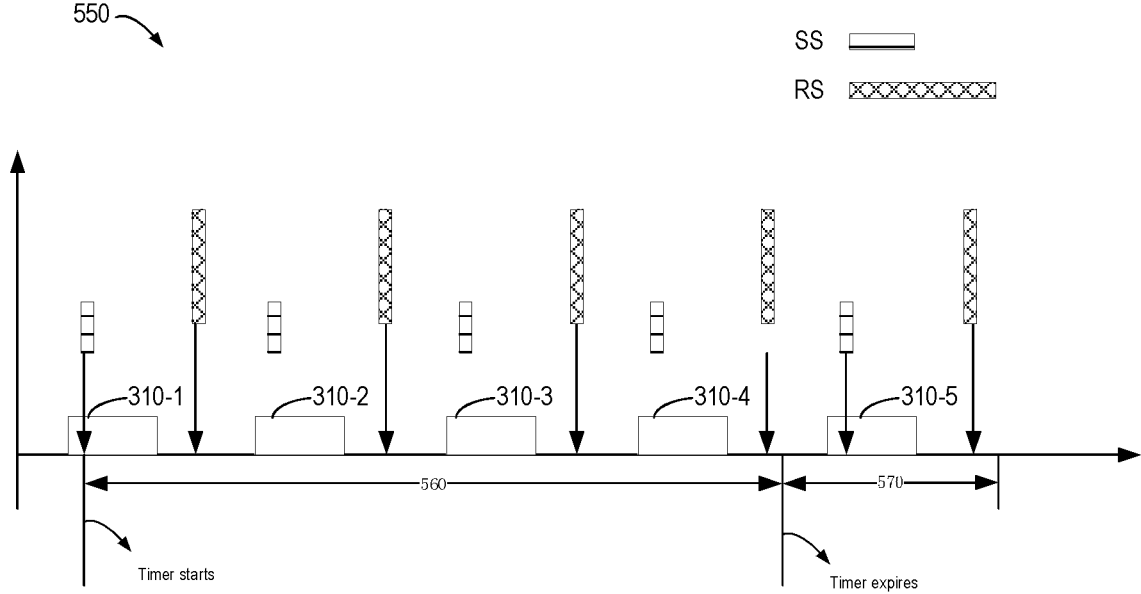

Different from the FIG. 5A, FIG. 5B illustrates a further block diagram of example measurement procedure 550 according to some example embodiments of the present disclosure. In the specific example of FIG. 5B, the second measurement occasions are not overlapped with the first measurement occasions, which means that the first device 110 is able to measure the RS and SS in parallel technically.

For the sake of brevity, the same elements in FIG. 5B and FIG. 5B are labelled with same reference number and the descriptions of the same elements are omitted below.

As illustrated in FIG. 5B, the first device 110 starts a validity timer first, and then during the period 560, the first device 110 suspends measuring the SS and merely measures RS. As the first device 110 does not have to measure or detect SS during period 560, the power consumption of the first device 110 is reduced accordingly.

Further, if the validity timer expires, the first device 110 resumes to measure the SS. As illustrated in FIG. 5B, during the period 570, the first device 110 resumes measuring the SS.

As the RS resources to be measured are not overlapped with the SS resources to be measured, the first device 110 may measure the RS and SS in parallel.

Additionally, in some example embodiments, the first device 110 may start the validity timer according to some criterion or condition.

In some example embodiments, the first device 110 starts a validity timer in response to determining synchronization timing from a SS or successfully measuring the SS. It is to be understood that the above examples of criterion or condition are only for the purpose of illustration without suggesting any limitations. In some other example, the first device 110 may determine to whether to start the validity timer or not.

Further, the duration of the validity timer (i.e., the period for suspending the measurement of SS) may be determined or configured by the first device 110, or be configured by the second device 120.

In addition to using a validity timer, the first device 110 also may determine whether to suspend measuring the SS at one or more of the second measurement occasions according to some certain event condition.

In some example embodiments, the event condition may relate to the signal strength of the RS to be measure. For this specific example of event condition, if the event condition is met, the first device 110 may determine that the beam corresponding to the RS resource is good enough and the neighbored cell 131 is likely to be detected. If the event condition is not met, the first device 110 may determine that the measurement of RS is degrading (for example, due to cell fading or the beam change), which means that the neighbored cell 131 needs to be detected or monitored.

In some example embodiments, the first device 110 suspends measuring the SS at one or more of the second measurement occasions in response to signal strength of the reference signal being above a strength threshold, and resumes measuring the SS at the second measurement occasions in response to signal strength of the reference signal being below a strength threshold.

In some example embodiments, the event condition may relate to a necessity of measuring the SS. For example, if the first device determines that determined that the probability of a mobile management event (such as, a handover) is relatively low, the first device may determine to suspend measuring the SS.

In some example embodiments, the first device 110 suspends measuring the SS at one or more of the second measurement occasions in response to a moving velocity of the first device being below a velocity threshold and resumes measuring the SS at the second measurement occasions in response to a moving velocity of the first device being above a velocity threshold.

Figure 6A:
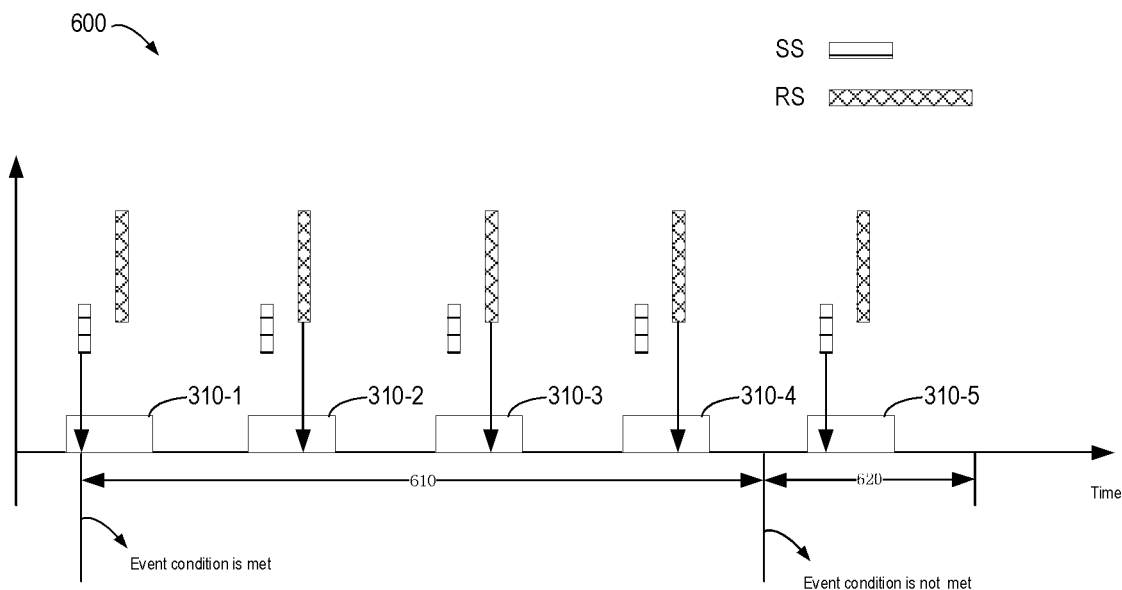
FIGS. 6A and 6B illustrate block diagrams of example measurement procedure according to some example embodiments of the present disclosure, respectively.
Figure 6B:
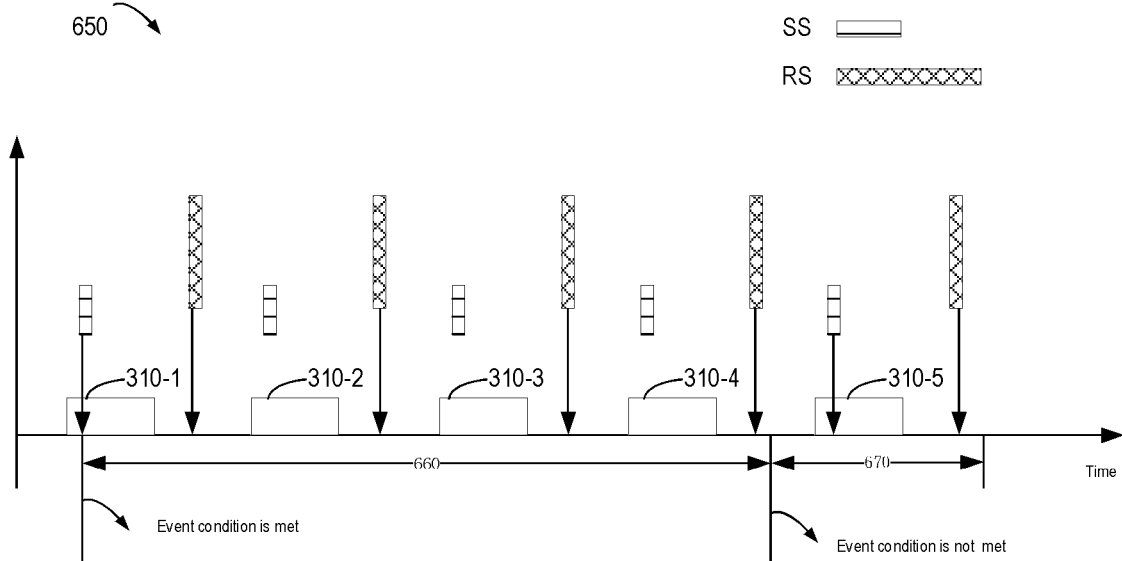

Details for suspending measuring the SS according to event condition are discussed by referring to FIG. 6A and FIG. 6B.

Reference is now made to FIG. 6A, which illustrates a block diagram of example measurement procedure 600 according to some example embodiments of the present disclosure. For the sake of brevity, the same elements in FIG. 3 and FIG. 6A are labelled with same reference number and the descriptions of the same elements are omitted below.

In the specific example of FIG. 6A, the second measurement occasions are overlapped with the first measurement occasions, which means that within each of the second measurement occasions 310-1 to 310-5, only one signal can be measured.

As illustrated in FIG. 6A, the first device 110 determines that the event condition is met by detecting a respective event, and then during the period 610, the first device 110 suspends measuring the SS and merely measures RS. As there is no interruption from measuring the SS, all the measurement occasions can be used for measuring RS. Therefore, the delay of the measurement of RS is reduced and a faster RS measurement can be achieved.

Further, if the first device 110 determines that the event condition is not met any more by detecting a further respective event, the first device 110 resumes to measure the SS. As illustrated in FIG. 6A, during the period 620, the first device 110 resumes measuring the SS. Further, during the period 620, as the RS resources to be measured overlapped with the SS resources to be measured, the first device 110 may apply a scheduling restriction on both SS and RS resources to be measured. Further, the first device 110 may be configured to prioritize detection of SS at the second measurement occasion(s).

Different from the FIG. 6A, FIG. 6B illustrates a further block diagram of example measurement procedure 650 according to some example embodiments of the present disclosure. In the specific example of FIG. 6B, the second measurement occasions are not overlapped with the first measurement occasions, which means that the first device 110 is able to measure the RS and SS in parallel technically. For the sake of brevity, the same elements in FIG. 6A and FIG. 6B are labelled with same reference number and the descriptions of the same elements are omitted below.

As illustrated in FIG. 6B, the first device 110 determines that the event condition is met by detecting a respective event, and then during the period 660, the first device 110 suspends measuring the SS and merely measures RS. As the first device 110 does not have to measure or detect SS during period 660, the power consumption of the first device 110 is reduced accordingly.

Further, if the first device 110 determines 240 that the event condition is not met any more by detecting a further respective event, the first device 110 resumes to measure the SS. As illustrated in FIG. 6B, during the period 670, the first device 110 resumes measuring the SS. As the RS resources to be measured are not overlapped with the SS resources to be measured, the first device 110 may measure the RS and SS in parallel.

Alternatively, or in addition, the first device 110 may suspend measuring the SS by measuring the SS with a measurement periodicity, where the measurement periodicity is larger than a periodicity of the second measurement occasions.

Figure 7:
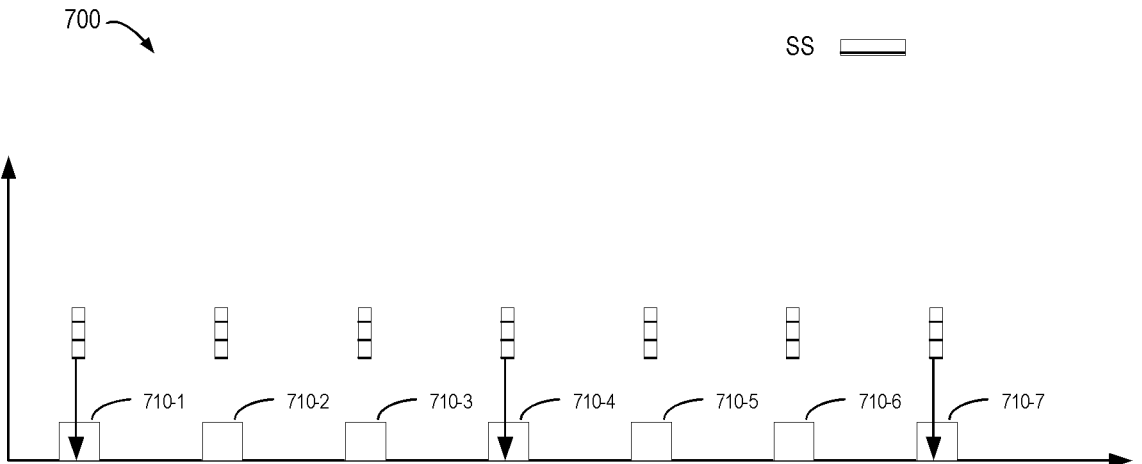
FIG. 7 illustrates a block diagram of example measurement procedure according to some example embodiments of the present disclosure.

Details for suspending measuring the SS with the measurement periodicity are discussed by referring to FIG. 7.

Reference is now made to FIG. 7, which illustrates a block diagram of example measurement procedure 700 according to some example embodiments of the present disclosure. For the sake of brevity, the same elements in FIGS. 3 and 7 are labelled with same reference number and the descriptions of the same elements are omitted below.

In the specific example of FIG. 7, seven second measurement occasions 710-1 to 710-7 are illustrated. That is, the first device can receive the SS from the neighbor cell 131 at the second measurement occasions 710-1 to 710-7. However, as illustrated in FIG. 7, the first device 110 merely measures and receives the SS at second measurement occasions 710-1, 710-4 and 710-7. That is, the measurement periodicity is three times of the periodicity of the second measurement occasions.

It is to be understood that the relationship between the measurement periodicity and the periodicity of the second measurement occasions is only for the purpose of illustration without suggesting any limitations. In other example embodiments, the measurement periodicity may be any multiple of the periodicity of the second measurement occasions.

Additionally, in some example embodiments, the first device 110 can automatically determines and applies the measurement periodicity when the first device 110 determines to performing operation of skipping measuring the SS. That is, the measurement periodicity is a pre-known value for the first device 110, or the first device 110 may determine the measurement periodicity by itself.

Alternatively, the measurement periodicity may be configured by the second device 120. As one example, the second device 120 indicates the measurement periodicity by IE associated SSB. In particular, a scaling factor can be used to indicate if the first device shall disable measuring SS or apply an extended measurement periodicity.

Through the above discussion, the present disclosure has fully discussed about how to skip measuring the SS at one or more of the second measurement occasions, such as, the first device can skip the measuring the SS according to some certain criterion or condition (such as, whether the synchronization timing is valid, whether the resources are overlapped, whether the measurements are conflict, whether the neighbor cell is synchronous with the serving cell, and the like), and also fully discussed about the implement manners of skipping measuring the SS (such as, disabling measuring the SS, or suspend part of the second measurement occasions by using a validity timer, an event condition or an extended measurement periodicity). It is to be understood that the one or more criterion or condition can be applied, and also one or more implement manners may be combined.

The above discussion is based on the assumption that the measurement of RS shares the same components (i.e., searcher) with the measurement of SS. However, first device 110 comprises a plurality of components available for measuring the reference signal and the SS. For this specific scenario, in some example embodiments, the first device 110 measures the reference signal by using a first component of the plurality of components, and measures the SS by using a second component of the plurality of components without skipping measuring the SS.

In some example embodiments, the first device 110 measures the reference signal by using a first component of the plurality of components and measures the synchronization signal by using a second component of the plurality of components without skipping measuring the reference signal, if the first device comprising a plurality of components available for measuring different cells.

In some example embodiments, the first device 110 measures the synchronization signal without skipping measuring the reference signal in accordance with a determination of the second component is available to be used.

In some example embodiments, the first component may be a component used for PCell or serving cell 121, and the second component may be a component used for SCell or neighbor cell 131. Further, the first component may be used for measuring RS, and the second component may be used for measuring SS in the neighbor cell 131 if the first component is not being used by measuring in PCell 121.

It is to be understood that in some example embodiments according to the present disclosure, the first device 110 may execute the solution by itself, and the other example embodiments, the first device 110 may execute the solution by being assisted by the second device 120.

In some example embodiments, the first device 110 transmits 220, to the second device information about a capability of the first device to skip measuring the SS.

In this way, the second device 120 may be informed the information about the capability of the first device 110 to skip measuring the SS. If the second device 120 determines that the first device 110 has the capability to skip measuring the SS, the second device 120 may transmit 230 some configuration information or parameters to the first device 110.

In some example embodiments, the first device 110 receives 230 an indication for enabling the first device to skip measuring the synchronization signal. After receiving the indication, the first device 110 can perform the process of skipping measuring the SS. Else, the first device 110 should disable to perform the process of skipping measuring the SS.

In some example embodiments, the first device 110 receives information about whether to skip measuring the synchronization signal or not. In information may be represented in any suitable manner.

In some example embodiments, the first device 110 receives parameters used for skipping measuring the synchronization signal, such as, the certain criterion or condition for determining whether to skip measuring the SS or not, the event condition, the duration of the timer for suspending measuring the SS, the velocity threshold, the measurement periodicity, and the like.

In this way, the second device 120 may apply a more suitable strategy for network management and also help the second device 120 to anticipate the behavior of the first device.

In this way, the delay of the measurement for RS with an associated SS is reduced by minimizing the interruption with measurement of SS, while ensures the RS based measurement reports have qualified accuracy with exact timing. Further, the solution according to the present discourse reduces power consumption of the first device and avoids unnecessary measurement efforts.

Figure 8:
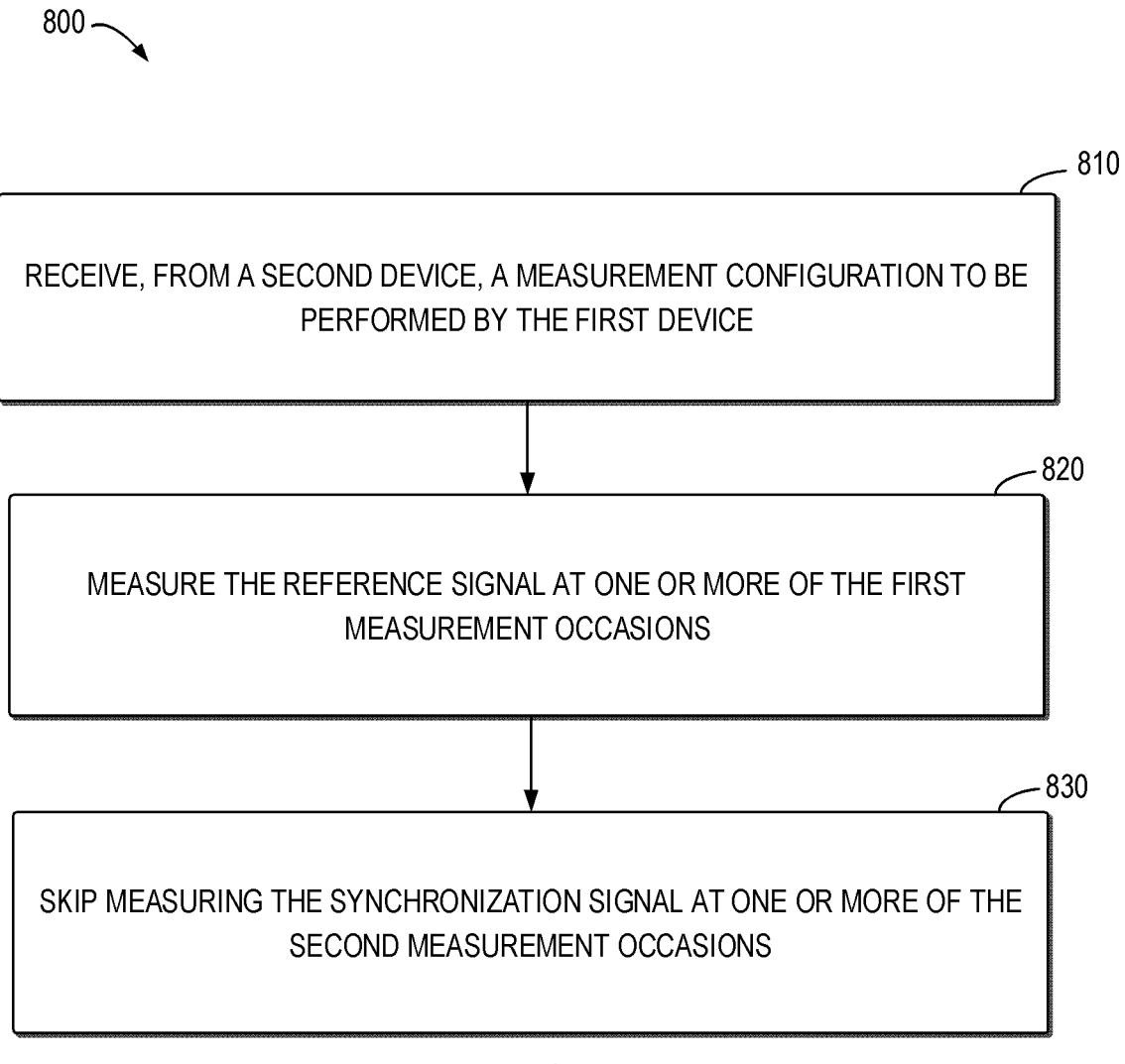
FIG. 8 illustrates a flowchart of an example method according to some embodiments of the present disclosure.

FIG. 8 shows a flowchart of an example method 800 implemented at a first device 110 in accordance with some example embodiments of the present disclosure. For the purpose of discussion, the method 800 will be described from the perspective of the first device 110 110 with respect to FIG. 1.

At block 810, the first device 110 receives, rom a second device 120, a measurement configuration to be performed by the first device 110, the measurement configuration comprising at least the following: first measurement occasions configured for the first device 110 for receiving a reference signal, and information about a synchronization signal associated with the reference signal, the synchronization signal to be measured at second measurement occasions.

At block 820, the first device 110 measures the reference signal at one or more of the first measurement occasions.

At block 830, the first device 110 skips measuring the synchronization signal at one or more of the second measurement occasions.

In some example embodiments, the first device 110 measures the reference signal in response to: detecting the synchronization signal associated with the reference signal according to the measurement configuration.

In some example embodiments, the first device 110 skips measuring the synchronization signal in response to: detecting the synchronization signal associated with the reference signal according to the measurement configuration.

In some example embodiments, the first device 110 skips measuring the synchronization signal at one or more of the second measurement occasions in accordance with a determination of at least one of the following: synchronization timing determined from the synchronization signal being valid for measuring the reference signal; the second measurement occasions being at least partly overlapped with the first measurement occasions; or measuring the reference signal conflicting with measuring the synchronization signal.

In some example embodiments, the first device 110 skips measuring the synchronization signal at one or more of the second measurement occasions in accordance with a determination of at least one of the following: a neighbor cell being synchronous with a serving cell; the reference signal being configured as a tracking reference signal; a period between a current time point and a pervious time point of a last measurement of the synchronization signal being shorter than a pre-configured period; a moving velocity of the first device 110 being below a velocity threshold; or signal strength of the reference signal being above a strength threshold.

In some example embodiments, the first device 110 determines the neighbor cell being synchronous with the serving cell in response to receiving an indication that indicates the neighbor cell is synchronous with the serving cell from the second device 120.

In some example embodiments, the first device 110 skips measuring the synchronization signal by: disabling measuring the synchronization signal at the second measurement occasions.

In some example embodiments, the first device 110 disables measuring the synchronization signal at the second measurement occasions in accordance with a determination of the neighbor cell being synchronous with the serving cell.

In some example embodiments, the first device 110 skips measuring the synchronization signal by: starting a validity timer; and in accordance with a determination that the validity timer is not timeout, suspending measuring the synchronization signal at one or more of the second measurement occasions; and in accordance with a determination that the validity timer is timeout, measuring the synchronization signal at one or more of the second measurement occasions to detect the cell.

In some example embodiments, the first device 110 starts the validity timer by: starting the validity timer in response to at least one of the following: detecting the synchronization signal associated with the reference signal according to the measurement configuration.

In some example embodiments, the first device 110 skips measuring the synchronization signal by: determining a measurement periodicity larger than a periodicity of the second measurement occasions; and measuring the synchronization signal with the measurement periodicity.

In some example embodiments, the first device 110 skips measuring the synchronization signal by: suspending measuring the synchronization signal at one or more of the second measurement occasions in response to signal strength of the reference signal being above a strength threshold, and resuming measuring the synchronization signal at the second measurement occasions in response to a signal strength of the reference signal being below a strength threshold.

In some example embodiments, the first device 110 skips measuring the synchronization signal by: suspending measuring the synchronization signal at one or more of the second measurement occasions in response to a moving velocity of the first device 110 being below a velocity threshold; and resuming measuring the synchronization signal at the second measurement occasions in response to a moving velocity of the first device 110 being above a velocity threshold.

In some example embodiments, the first device 110 in accordance with a determination that the first device 110 comprising a plurality of components available for measuring different cells: measure the reference signal by using a first component of the plurality of components; and measure the synchronization signal by using a second component of the plurality of components without skipping measuring the reference signal.

In some example embodiments, the first device 110 measures the synchronization signal without skipping measuring the reference signal in accordance with a determination of the second component is available to be used.

In some example embodiments, the first device 110 receives, from the second device 120 at least one of the following: an indication for enabling the first device 110 to skip measuring the synchronization signal; information about whether to skip measuring the synchronization signal or not; or at least one parameter used for skipping measuring the synchronization signal.

In some example embodiments, the first device 110 the at least one parameter indicates at least one of the following: a validity timer for skipping measuring the synchronization signal; a pre-configured period for suspending the synchronization signal;

a velocity threshold of the terminal device for triggering to skip measuring the synchronization signal; a strength threshold of the reference signal for triggering to skip measuring the synchronization signal; or an event for triggering to skip measuring the synchronization signal.

In some example embodiments, the first device 110 transmits, to the second device 120, information about a capability of the first device 110 to skip measuring the synchronization signal.

In some example embodiments, the first device 110, the reference signal is channel state information reference signal and the synchronization signal is synchronization signal block.

In some example embodiments, the first device 110 the first device 110 is a terminal device and the second device 120 is a network device.

FIG. 9 shows a flowchart of an example method 900 implemented at a second device 120 in accordance with some example embodiments of the present disclosure. For the purpose of discussion, the method 900 will be described from the perspective of the second device 120 with respect to FIG. 1.

At block 910, the second device 120 transmits, to a first device 110, a measurement configuration to be performed by the first device 110, the measurement configuration comprising at least the following: first measurement occasions configured for the first device 110 for receiving a reference signal, and information about a synchronization signal associated with the reference signal, the synchronization signal to be measured at second measurement occasions.

At block 910, the second device 120 transmits, an indication for enabling the first device 110 to skip measuring the synchronization signal; information about whether to skip measuring the synchronization signal or not; or at least one parameter used for skipping measuring the synchronization signal.

In some example embodiments, the at least one parameter indicates at least one of the following: a validity timer for skipping measuring the synchronization signal; a pre-configured period for suspending the synchronization signal; a velocity threshold of the terminal device for triggering to skip measuring the synchronization signal; a strength threshold of the reference signal for triggering to skip measuring the synchronization signal; or an event for triggering to skip measuring the synchronization signal.

In some example embodiments, the reference signal is channel state information reference signal and the synchronization signal is synchronization signal block.

In some example embodiments, the first device 110 is a terminal device and the second device 120 is a network device.

In some example embodiments, a second apparatus capable of performing any of the method 900 (for example, the second device 120) may comprise means for performing the respective operations of the method 900. The means may be implemented in any suitable form. For example, the means may be implemented in a circuitry or software module. The second apparatus may be implemented as or included in the second device 120.

In some example embodiments, a first apparatus capable of performing any of the method 800 (for example, the first device 110) may comprise means for performing the respective operations of the method 800. The means may be implemented in any suitable form. For example, the means may be implemented in a circuitry or software module. The first apparatus may be implemented as or included in the first device 110.

In some example embodiments, the first apparatus comprises means for receiving, at a first apparatus and from a second apparatus, a measurement configuration to be performed by the first apparatus, the measurement configuration comprising at least the following: first measurement occasions configured for the first apparatus for receiving a reference signal, and information about a synchronization signal associated with the reference signal, the synchronization signal to be measured at second measurement occasions; means for measuring the reference signal at one or more of the first measurement occasions; and means for skipping measuring the synchronization signal at one or more of the second measurement occasions.

In some example embodiments, the means for skipping measuring the synchronization signal comprises: means for skipping measuring the synchronization signal in response to: detecting the synchronization signal associated with the reference signal according to the measurement configuration.

In some example embodiments, the means for skipping measuring the synchronization signal comprises: means for skipping measuring the synchronization signal at one or more of the second measurement occasions in accordance with a determination of at least one of the following: synchronization timing determined from the synchronization signal being valid for measuring the reference signal; the second measurement occasions being at least partly overlapped with the first measurement occasions; or measuring the reference signal conflicting with measuring the synchronization signal.

In some example embodiments, the means for skipping measuring the synchronization signal comprises: means for skipping measuring the synchronization signal at one or more of the second measurement occasions in accordance with a determination of at least one of the following: a neighbor cell being synchronous with a serving cell; the reference signal being configured as a tracking reference signal; a period between a current time point and a pervious time point of a last measurement of the synchronization signal being shorter than a pre-configured period; a moving velocity of the first apparatus being below a velocity threshold; or signal strength of the reference signal being above a strength threshold.

In some example embodiments, the first apparatus further comprises means for in response to receiving an indication that indicates the neighbor cell is synchronous with the serving cell from the second apparatus, determining the neighbor cell being synchronous with the serving cell.

In some example embodiments, the first apparatus further comprises means for skipping measuring the synchronization signal by: disabling measuring the synchronization signal at the second measurement occasions.

In some example embodiments, means for skipping measuring the synchronization signal comprises: means for disabling measuring the synchronization signal at the second measurement occasions in accordance with a determination of the neighbor cell being synchronous with the serving cell.

In some example embodiments, means for skipping measuring the synchronization signal comprises: means for starting a validity timer; and means for in accordance with a determination that the validity timer is not timeout, suspending measuring the synchronization signal at one or more of the second measurement occasions; and means for in accordance with a determination that the validity timer is timeout, measuring the synchronization signal at one or more of the second measurement occasions to detect the cell.

In some example embodiments, means for starting the validity timer comprises: means for starting the validity timer in response to at least one of the following: detecting the synchronization signal associated with the reference signal according to the measurement configuration.

In some example embodiments, means for skipping measuring the synchronization signal comprises: means for determining a measurement periodicity larger than a periodicity of the second measurement occasions; and means for measuring the synchronization signal with the measurement periodicity.

In some example embodiments, means for skipping measuring the synchronization signal comprises suspending measuring the synchronization signal at one or more of the second measurement occasions in response to signal strength of the reference signal being above a strength threshold, and means for resuming measuring the synchronization signal at the second measurement occasions in response to a signal strength of the reference signal being below a strength threshold.

In some example embodiments, means for skipping measuring the synchronization signal comprises: means for suspending measuring the synchronization signal at one or more of the second measurement occasions in response to a moving velocity of the first apparatus being below a velocity threshold; and means for resuming measuring the synchronization signal at the second measurement occasions in response to a moving velocity of the first apparatus being above a velocity threshold.

In some example embodiments, the first apparatus further comprises means for in accordance with a determination that the first apparatus comprising a plurality of components available for measuring different cells: measuring the reference signal by using a first component of the plurality of components; and measuring the synchronization signal by using a second component of the plurality of components without skipping measuring the reference signal.

In some example embodiments, the first apparatus further comprises means for measuring the synchronization signal without skipping measuring the reference signal in accordance with a determination of the second component is available to be used.

In some example embodiments, the first apparatus further comprises means for receiving, from the second apparatus at least one of the following: an indication for enabling the first apparatus to skip measuring the synchronization signal; information about whether to skip measuring the synchronization signal or not; or at least one parameter used for skipping measuring the synchronization signal.

In some example embodiments, the at least one parameter indicates at least one of the following: a validity timer for skipping measuring the synchronization signal; a pre-configured period for suspending the synchronization signal; a velocity threshold of the terminal apparatus for triggering to skip measuring the synchronization signal; a strength threshold of the reference signal for triggering to skip measuring the synchronization signal; or an event for triggering to skip measuring the synchronization signal.

In some example embodiments, the first apparatus further comprises means for transmitting, to the second apparatus, information about a capability of the first apparatus to skip measuring the synchronization signal.

In some example embodiments, the reference signal is channel state information reference signal and the synchronization signal is synchronization signal block.

In some example embodiments, the first apparatus is a terminal apparatus and the second apparatus is a network apparatus.

In some example embodiments, a second apparatus capable of performing any of the method 900 (for example, the second apparatus 120) may comprise means for performing the respective operations of the method 900. The means may be implemented in any suitable form. For example, the means may be implemented in a circuitry or software module. The second apparatus may be implemented as or included in the second apparatus 120.

In some example embodiments, a second apparatus comprises means for transmitting, at a second apparatus and to a first apparatus, a measurement configuration to be performed by the first apparatus, the measurement configuration comprising at least the following: first measurement occasions configured for the first apparatus for receiving a reference signal, and information about a synchronization signal associated with the reference signal, the synchronization signal to be measured at second measurement occasions; and means for transmitting, to a first apparatus, at least one of the following: an indication for enabling the first apparatus to skip measuring the synchronization signal; at least one parameter used for skipping measuring the synchronization signal.

In some example embodiments, the at least one parameter indicates at least one of the following: a validity timer for skipping measuring the synchronization signal; a pre-configured period for suspending the synchronization signal; a velocity threshold of the terminal apparatus for triggering to skip measuring the synchronization signal; a strength threshold of the reference signal for triggering to skip measuring the synchronization signal; or an event for triggering to skip measuring the synchronization signal.

In some example embodiments, the second apparatus further comprises means for receiving, from the first apparatus, information about a capability of the first apparatus to skip measuring the synchronization signal.

In some example embodiments, the reference signal is channel state information reference signal and the synchronization signal is synchronization signal block.

In some example embodiments, the first apparatus is a terminal apparatus and the second apparatus is a network apparatus.

Figure 10:
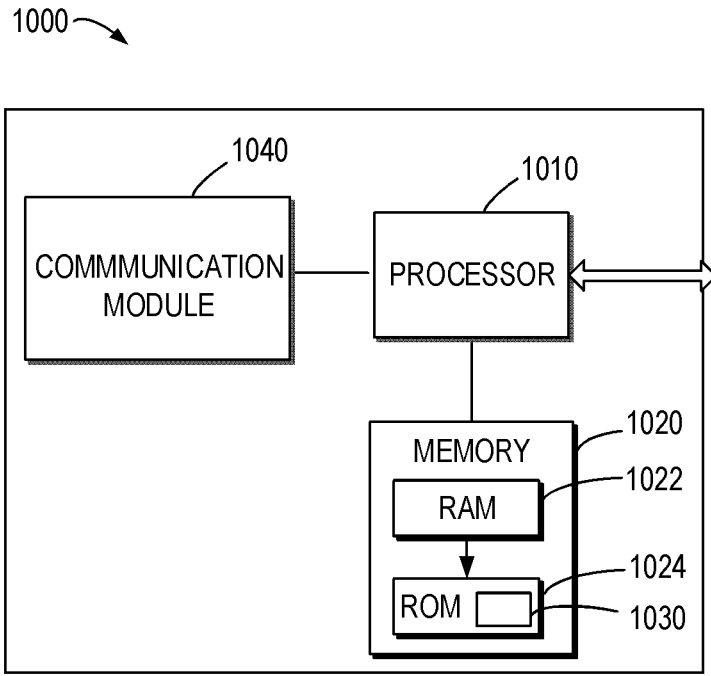
FIG. 10 illustrates a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement a communication device, for example, the first device 110 and the second device 120 as shown in FIG. 1. As shown, the device 1000 includes one or more processors 1010, one or more memories 1020 coupled to the processor 1010, and one or more communication modules 1040 (such as, transmitters and/or receivers) coupled to the processor 1010.

The communication module 1040 is for bidirectional communications. The communication module 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1024. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 7 to 8. The embodiments of the present disclosure may also be implemented by hardware or by a combination of software and hardware.

Figure 11:
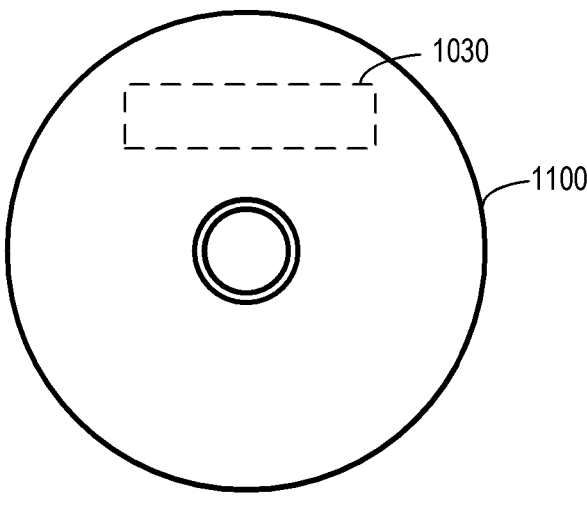
FIG. 11 illustrates a block diagram of an example computer readable medium in accordance with example embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700 or 800 as described above with reference to FIGS. 7-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one non-transitory memory storing instructions that, when executed with the at least one processor, cause the first device to:
receive, from a second device, a measurement configuration to be performed with the first device, the measurement configuration comprising at least the following:
first measurement occasions configured for the first device for receiving a reference signal, and
information about a synchronization signal associated with the reference signal, the synchronization signal to be measured at second measurement occasions;
measure the reference signal at one or more of the first measurement occasions; and skip measuring the synchronization signal at one or more of the second measurement occasions in accordance with a determination of at least one of the following:
synchronization timing determined from the synchronization signal being valid for measuring the reference signal;
the second measurement occasions being at least partly overlapped with the first measurement occasions; or
measuring the reference signal conflicting with measuring the synchronization signal.

2. The first device of claim 1, wherein the instructions, when executed with the at least one processor, further cause the first device to:
in accordance with a determination that the first device comprises a plurality of components available for measuring different cells:
measure the reference signal with using a first component of the plurality of components; and
measure the synchronization signal with using a second component of the plurality of components without skipping measuring the reference signal.

3. The first device of claim 2, wherein the instructions, when executed with the at least one processor, further cause the first device to:
measure the synchronization signal without skipping measuring the reference signal in accordance with a determination of the second component is available to be used.

4. The first device of claim 1, wherein the instructions, when executed with the at least one processor, further cause the first device to:
receive, from a second device, at least one of the following:
an indication for enabling the first device to skip measuring the synchronization signal;
information about whether to skip measuring the synchronization signal or not; or
at least one parameter used for skipping measuring the synchronization signal.

5. The first device of claim 4, wherein the at least one parameter indicates at least one of the following:
a validity timer for skipping measuring the synchronization signal;
a pre-configured period for suspending the synchronization signal;
a velocity threshold of the first device for triggering to skip measuring the synchronization signal;
a strength threshold of the reference signal for triggering to skip measuring the synchronization signal; or
an event for triggering to skip measuring the synchronization signal.

6. The first device of claim 1, wherein the instructions, when executed with the at least one processor, further cause the first device to:
transmit, to a second device, information about a capability of the first device to skip measuring the synchronization signal.

7. A second device, comprising:
at least one processor; and
at least one non-transitory memory storing instructions that, when executed with the at least one processor, cause the second device to:
transmit, to a first device, a measurement configuration to be performed with the first device, the measurement configuration comprising at least the following:

first measurement occasions configured for the first device for receiving a reference signal, and information about a synchronization signal associated with the reference signal, the synchronization signal to be measured at second measurement occasions; and transmit, to a first device, at least one of the following:

an indication for enabling the first device to skip measuring the synchronization signal;

information about whether to skip measuring the synchronization signal or not; or at least one parameter used for skipping measuring the synchronization signal; and receive, from the first device, information about a capability of the first device to skip measuring the synchronization signal.

8. The second device of claim 7, wherein the at least one parameter indicates at least one of the following:

a validity timer for skipping measuring the synchronization signal;

a pre-configured period for suspending the synchronization signal;

a velocity threshold of the first device for triggering to skip measuring the synchronization signal;

a strength threshold of the reference signal for triggering to skip measuring the synchronization signal; or an event for triggering to skip measuring the synchronization signal.

\* \* \* \* \*